United States Patent [19]

Moreland

[11] 3,752,618

[45] Aug. 14, 1973

[54] APPARATUS FOR CONTINUOUS SAUSAGE MANUFACTURE

[76] Inventor: Stephen T. Moreland, 789 Anita Ave., Grosse Pointe Woods, Mich. 48236

[22] Filed: Mar. 31, 1972

[21] Appl. No.: 239,915

Related U.S. Application Data

[62] Division of Ser. No. 46,975, June 17, 1970, Pat. No. 3,698,916.

[52] U.S. Cl. .................. 425/133, 53/140, 118/16, 425/92, 425/113
[51] Int. Cl. ............................................. A22c 11/02
[58] Field of Search ............... 53/140; 425/92, 113, 425/131, 133, 461; 118/13, 16, 24; 99/169, 175, 176, 171 LP

[56] References Cited
UNITED STATES PATENTS

| | | | |
|---|---|---|---|
| 3,552,259 | 7/1968 | Griffith | 425/113 X |
| 3,461,490 | 8/1969 | Cottingham | 425/113 |
| 3,241,503 | 3/1966 | Schafer | 425/133 X |
| 3,622,353 | 6/1969 | Bradshaw et al. | 99/176 X |
| 3,538,207 | 11/1970 | Toole | 425/113 X |
| 3,679,338 | 7/1972 | Lutz | 425/131 |
| 2,872,763 | 2/1959 | Meissner | 99/109 X |

Primary Examiner—Robert L. Spruill
Attorney—Howard H. Darbo, Edward C. Vandenburgh et al.

[57] ABSTRACT

A sausage emulsion is pumped through a passageway. At a first location along the passageway a water barrier material is introduced about the periphery of the emulsion. At a point downstream from that location a heat liquified casing forming material is introduced about the water barrier and solidified by cooling. Thereafter, the filled casing is handled conventionally.

7 Claims, 1 Drawing Figure

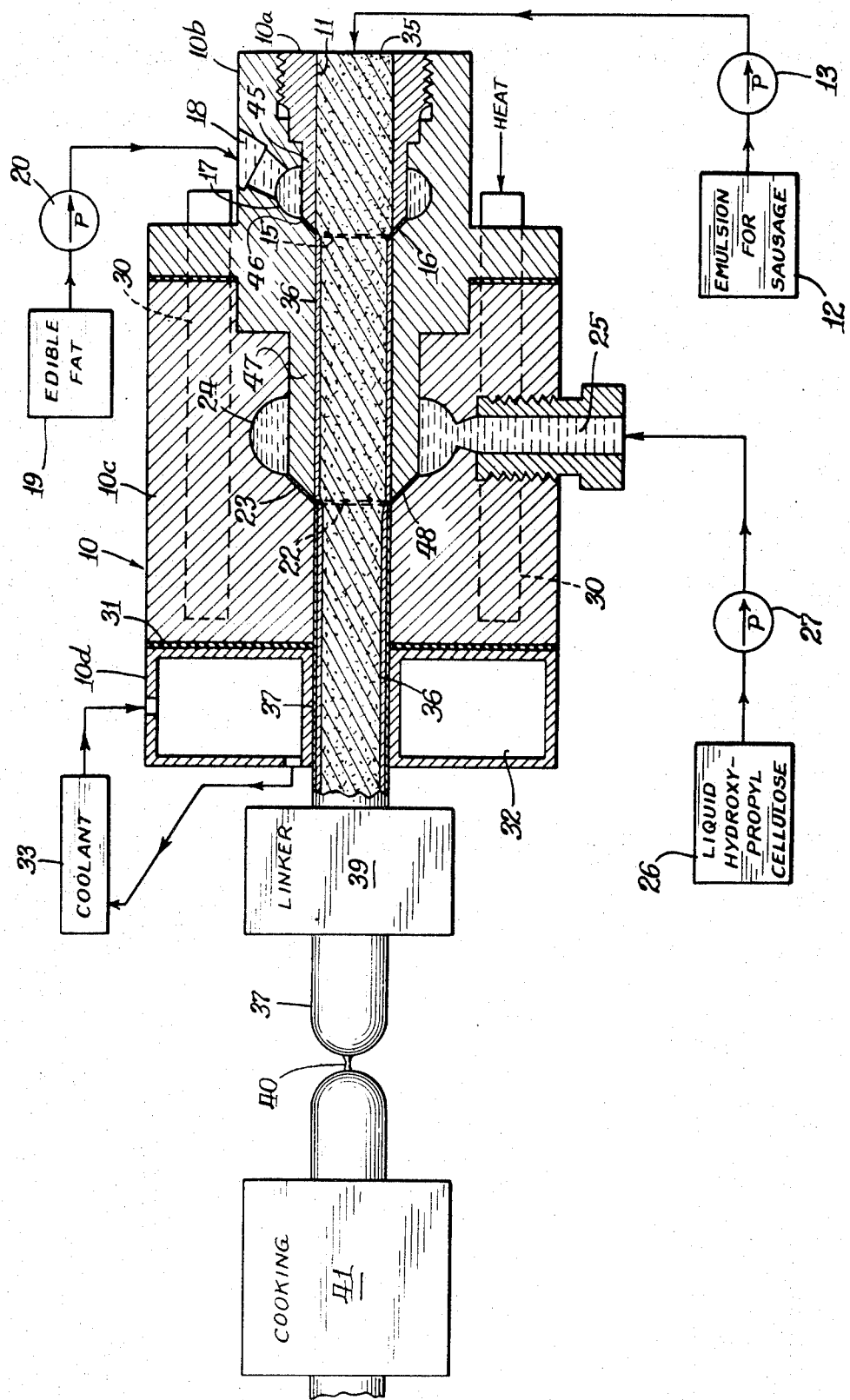

APPARATUS FOR CONTINUOUS SAUSAGE MANUFACTURE

This application is a division of application Ser. No. 46,975, filed June 17, 1970 and now U.S. Pat. No. 3,698,916.

BACKGROUND AND SUMMARY OF THE INVENTION

Conventionally, a sausage emulsion is introduced into a flexible casing, natural or artificial, which casing is of limited length. Thereafter, the casing is divided into "links" and further processed, including heating to solidify the emulsion into a form in which it will be self-sustaining as to shape after the removal of the casing. As a practical matter, it has not been commercially feasible to use casings of unlimited lengths because of the difficulty of introducing the emulsion into the casing; lengths of casing have been used based upon the length of stuffing horn that would receive the casing in shirred form. This has been a barrier to efforts to automate sausage manufacturing operations.

Efforts also have been made to produce sausages in rigid molds in which the emulsion is cooked sufficiently so as to become self-sustaining in form. Thereafter, the sausages are removed from the molds for further processing. Such procedures have not been entirely satisfactory from a commercial point of view because of the difficulty of producing a finished product having the same physical characteristics as a sausage produced in a flexible casing.

With the millions of pounds of sausages, particularly frankfurters, consumed every year there is a real need to automate the entire sausage making operation while still producing a product having the physical characteristics that purchasers expect and demand. There are commercially available items of apparatus suitable for automating on a continuous basis every phase of the overall sausage making operation except that of stuffing the casings. The principal object of the present invention is to satisfy this missing link and provide a method and apparatus for continuously producing a filled casing of indefinite length.

DESCRIPTION OF THE DRAWING

The drawing is a diagrammatic illustration of an apparatus for carrying out the method of my invention and producing a filled casing of continuous length.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

In the method of my invention the liquid sausage emulsion is continuously pumped along a confined path. At a point along this path a casing forming material is introduced about the periphery of the emulsion and solidified into a continuous casing. Thereafter, the confinement is removed and the filled casing processed in a conventional manner, i.e., linking and cooking, with or without smoking. I prefer to use a casing forming material which is liquified by a relatively low heat. The material that I have found particularly advantageous for this purpose is hydroxy-propyl cellulose. Methyl cellulose or ethyl cellulose are among the other materials that could be used.

Hydroxy-propyl cellulose softens at approximately 266° F. and becomes liquid at a slightly higher temperature. The temperature employed should be sufficient to liquify the hydroxy-propyl cellulose but not so great such that there is a significant precooking of the emulsion as it moves along the passageway. While it will vary because of other factors, a temperature of approximately 410–480° F. should normally be satisfactory.

At certain temperatures hydroxy-propyl cellulose is water soluble and, of course, a conventional sausage emulsion includes a significant amount of water. To protect the casing against deleterious action by the water in the emulsion, I introduce into the passageway, and about the emulsion, at a point upstream of the casing forming location, a water barrier material which forms a film about the emulsion and separates the emulsion from the hydroxy-propyl cellulose after the latter is introduced. A particularly advantageous water barrier material is an edible fat, liquid or solid. This could be an animal, mineral or vegetable product. The term "fat" is employed herein generically to such fats whether in solid or liquid form. Carnauba wax also could be used.

The hydroxy-propyl cellulose is particularly advantageous because it is edible and has been approved for use in connection with foods. It is soluble in the gastric juices. It is very flexible in the solid form and is very strong. It is soluble in water below 104° F. but is insoluble in water above 113° F. Thus, after the processing of the sausages in the casing has been completed, the so-called skinless frankfurters may be produced by removing the casing through the use of water below 104° F. If the casing, i.e., skin, is to be left on the sausage, the washing is performed in water having a temperature above 113° F.

Referring to the drawing, there is a body, generally 10, which has a passageway 11 extending axially therethrough. Sausage emulsion from a supply 12 is forced through passageway 11 by pump 13 (from right to left in the drawing). At a first location along passageway 11 is an annular opening 15 connected by a duct 16 to an annular supply chamber 17. Supply chamber 17 is fed through a passage 18 with an edible fat from a supply 19. The feeding is performed by a pump 20. While opening 15 preferably is continuous (an infinite series of openings) it could be formed by a plurality of discrete openings spaced sufficiently close together so that a continuous film of the edible fat would be formed about the emulsion. Opening 15 and duct 16 are formed by the separation of body parts 10a and 10b, which are otherwise connected. That is, body part 10a has a projection 45 which extends into an opening in body part 10b, which opening is coaxial with the passageway 11. The distal end of that projection is spaced just a short distance from face 46 to define the duct 16.

At a second location along the passageway, downstream from the first, is a second annular opening 22. Like the first, it could be a series of discrete openins about the periphery, but perferably is a continuous opening formed by spaced body parts 10b and 10c (otherwise connected). A duct 23 connects opening 22 with a supply chamber 24. A supply passage 25 communicates with chamber 24 for the introduction of the casing forming material from a source 26 by means of a pump 27. Body part 10b has a projection 47 which extends into an opening in body part 10c, which opening is coaxial with the passageway 11. The distal end of projection 47 is spaced just a short distance from face 48 to define duct 23. The body part 10c is heated to at least assist in maintaining the liquification of the hydroxy-propyl cellulose. To this end there are a plurality of electric cartridge heaters 30 inserted in, and in contact with, the body part 10c to maintain the desired temperature of the same. A heat insulator 31 separates body part 10c from body part 10d. Body part 10d contains an internal chamber 32 through which a coolant may be circulated from a source 33.

The emulsion from source 12 is injected into passageway 11 so as to fill the passageway with an emulsion 35. This is encased in an edible fat 36 introduced through opening 15. Thereafter, a casing 37 is formed about the edible fat by material introduced through opening 22. Before the downstream end of passageway 11, the casing material is solidified to an extent such that it will maintain the desired configuration of itself and the fluid emulsion therein. To some extent this cooling and solidification will be achieved by the temperature of the emulsion 35. In some, but not necessarily all, instances the cooling body section 10d is employed so as to achieve the required solidification of the casing material.

The thus produced filled casing is introduced into a linker 39 which is a conventional item of equipment for linking filled casings, i.e., producing divisions 40 in the casing at spaced intervals and thus defining the discrete sections of filled casing which will ultimately be the individual sausages. Thereafter, the continuous length is introduced into a cooking tunnel 41 in which the emulsion is processed sufficiently so that the desired sausages result. Again, this is a conventional item of equipment and may or may not include provisions for smoking, chilling or other processing.

From the foregoing it will be apparent that a continuous length of filled casing may be produced for processing into individual sausages. The various pumps 13, 20, 27 will feed continuously and can be provided with variable speed drives by which the comparative volume of material may be controlled to produce the desired results. The supply 26 of the heat sensitive casing forming material is preheated to liquify the material. In some installations this may be sufficient heat so that the material stays fluid at least up to the time that it reaches opening 22 to establish the casing and the supplemental heat provided by cartridge heaters 30 can be dispensed with. Similarly, by controlling the heat in the length of passageway 11, etc., it is possible in some installations to dispense with the coolant body section 10d. If a solid fat, e.g., lard, were employed in supply 19, that supply would be also heated so as to liquify the fat for injection through annular opening 15.

I claim:

1. An apparatus for use in the process of making sausages from a liquid emulsion, said apparatus comprising:
   a body defining a passageway therethrough for confining said liquid emulsion to a path, at a location intermediate the ends of the passageway means defining injection openings about the periphery of and communicating directly with the passageway, and a first supply passage communicating with said means;
   a source of said emulsion;
   a pump device communicating with one end of said passageway and said source for introducing said emulsion into and through said passageway;
   said body defining second means between said one end and said location, second injection openings about the periphery of the passageway and a second supply passage communicating with said second injection openings;
   including a source of water barrier substance;
   including a pump device communicating with said second supply passage and said water barrier substance source for introducing the water barrier substance through said second means and about the periphery of the emulsion;
   a source of liquid casing forming material; and
   a pump device communicating with said first supply passage and said casing forming material source for introducing liquid casing forming material through said means and about the periphery of the water barrier substance;
   said passageway being sufficiently long downstream of said means so that said material becomes form sustaining by the time it reaches the downstream end.

2. An apparatus as set forth in claim 1, wherein said body includes heating means to heat that portion of the body at said location.

3. An apparatus as set forth in claim 2, wherein said body downstream of said location includes cooling means for cooling that part of the body defining said passageway downstream of said location.

4. An apparatus for use in the process of making sausages from a liquid emulsion, said apparatus comprising:
   a body defining a passageway therethrough, at a location intermediate the ends of the passageway means defining injection openings about the periphery of the passageway, and a supply passage communicating with said means, said body including heating means to heat that portion of the body at said location, said passageway being formed about an axis and being of approximately constant diameter throughout its length, and said body comprising:
   a first body part having two transverse walls with a first portion of said passageway in the body part and extending inwardly from one of said walls, said body part having an opening coaxial with said portion of said passageway and substantially larger in cross-section than said passageway, said coaxial opening extending from said passageway to the other of said walls, said body part defining a face at the inwardly end of said coaxial opening, which face extends outwardly from said portion; and
   a second body part having two transverse walls with one of the walls thereof abutting the other of the walls of the first body part to form a fluid seal between the body parts, said second body part having a projection extending from the one wall thereof into said coaxial opening, said projection having a distal end spaced just a short distance from said face to thereby form an annular duct much smaller in width than the diameter of said passageway, communicating with said passageway and defining said injection openings, said two body parts defining an enlarged annular supply chamber extending around said projection and communicating with said duct, one of said body parts having an opening from the exterior of the body part to said supply chamber, said supply chamber and the last mentioned opening forming said supply passage, said second body part having a second portion of said passageway extending inwardly from said distal end;

said body parts being attached and maintaining a fixed position with respect to each other during use;

a pump device communicating with one end of said passageway for introducing said emulsion into and through said passageway; and a pump device communicating with said supply passage for introducing liquid casing forming material through said means and about the periphery of the emulsion;

said passageway being sufficiently long downstream of said means so that said material becomes form sustaining by the time it reaches the downstream end.

5. An apparatus as set forth in claim 4, wherein said heating means maintains the temperature above about 266° F. and below a temperature at which there will be any significant cooking of said emulsion while in said passageway.

6. An apparatus for use in the process of making sausages from a liquid emulsion, said apparatus comprising:

a body defining a passageway therethrough, at a location intermediate the ends of the passageway means defining injection openings about the periphery of the passageway, and a supply passage communicating with said means, said passageway being formed about an axis and being of approximately constant diameter throughout its length, said body comprising:

a first body part having two walls transverse to said passageway with a first portion of said passageway in the body part and extending inwardly from one of said walls, said body part having an opening coaxial with said portion of said passageway and substantially larger in cross-section than said passageway, said opening extending from said passageway to the other of said walls, said body part defining a face at the inwardly end of said opening, which face extends outwardly from said portion; and a second body part having two walls transverse to said passageway with one of the walls thereof abutting the other of the walls of the first body part to form a fluid seal between the body parts, said second body part having a projection extending from the one wall thereof into said opening, said projection having a distal end spaced just a short distance from said face to thereby form an annular duct much smaller in width than the diameter of said passageway, communicating with said passageway and defining said injection openings, said two body parts defining an enlarged annular supply chamber extending around said projection and communicating with said duct, one of said body parts having an opening from the exterior of the body part to said supply chamber, said supply chamber and the last mentioned opening forming said supply passage, said second body part having a second portion of said passageway extending inwardly from said distal end;

said body parts being attached and maintaining a fixed position with respect to each other during use;

a pump device communicating with one end of said passageway for introducing said emulsion into and through said passageway; and a pump device communicating with said supply passage for introducing liquid casing forming material through said means and about the periphery of the emulsion;

said passageway being sufficiently long downstream of said means so that said material becomes form sustaining by the time it reaches the downstream end.

7. An apparatus as set forth in claim 6, wherein said body defines second means between said one end and said location and defining second injection openings about the periphery of the passageway and a second supply passage communicating with said second means, said second body part having an opening coaxial with said portion of said passageway and substantially larger in cross-section than said passageway, said opening in said second body part extending from said second portion of said passageway to the other of the walls of the second body part, said second body part defining a face at the inwardly end of said opening therein, which face extends outwardly from said second portion, a third body part having two walls transverse to said passageway with one of the walls thereof abutting the other of the walls of the second body part to form a fluid seal between the second and third body parts, said third body part having a projection extending from the one wall thereof into said opening in the second body part, said projection of the third body part having a distal end spaced just a short distance from said face on the second body part to thereby form a second annular duct much smaller in width than the diameter of said passageway, communicating with said passageway and defining said second injection openings, said second and third body parts defining a second enlarged annular supply chamber extending around said projection of the third body part and communicating with said second duct, one of said second and third body parts having an opening from the exterior thereof to said second supply chamber, said second supply chamber and the last mentioned opening forming said second supply passage, said third body part having a third portion of said passageway extending inwardly from said distal end, said body parts being attached and maintaining a fixed position with respect to each other during use; and including a pump device communicating with said second supply passage for introducing a water barrier substance through said second means and about the periphery of the emulsion.

* * * * *